United States Patent [19]

Coyle et al.

[11] 3,861,903

[45] Jan. 21, 1975

[54] UPGRADING OF CHROMITE AND OTHER FERRUGINOUS ORES

[75] Inventors: Thomas Joseph Coyle; Herbert Joseph Bovey, both of Johannesburg, South Africa

[73] Assignee: Anglo American Corporation of South Africa Limited, Johannesburg, South Africa

[22] Filed: Aug. 7, 1972

[21] Appl. No.: 278,225

Related U.S. Application Data

[63] Continuation of Ser. No. 860,063, Sept. 22, 1969, abandoned.

[30] Foreign Application Priority Data

Sept. 26, 1968 South Africa.................... 68/6242

[52] U.S. Cl................... 75/1, 75/101 R, 75/104, 75/121, 423/53, 423/57, 423/86, 423/140, 423/150, 423/146, 423/147

[51] Int. Cl............................................. C22b 1/00

[58] Field of Search......... 75/1, 2, 104, 101 R, 108, 75/121; 423/53, 86, 150, 57, 140, 146, 147

[56] References Cited

UNITED STATES PATENTS

| | | | |
|---|---|---|---|
| 981,451 | 1/1911 | McKechnie et al.................. | 75/104 |
| 1,129,407 | 2/1915 | Lay..................................... | 423/319 |
| 1,327,061 | 1/1920 | Penniman........................... | 423/632 |
| 3,105,755 | 10/1963 | Green.................................. | 75/1 |
| 3,169,853 | 2/1965 | van Es............................. | 75/104 X |
| 3,252,787 | 5/1966 | Shiah.................................. | 75/1 |
| 3,681,047 | 8/1972 | Lynd et al........................ | 75/104 X |
| 3,684,485 | 8/1972 | Meyer et al...................... | 75/104 X |

FOREIGN PATENTS OR APPLICATIONS 15,849   0/1911   Great Britain...................... 75/104

OTHER PUBLICATIONS

Becker et al. "Proceedings of Australian Institute of Mining & Metallurgy," No. 214, 1965, pp. 21-44.

*Primary Examiner*—Herbert T. Carter
*Attorney, Agent, or Firm*—Young & Thompson

[57] ABSTRACT

Prereduced ferruginous ores of chromite, ilmenite and phosphate minerals are upgraded in a single stage process utilising ferrous sulphate or ferrous chloride leach solutions. While leaching takes place air or oxygen is blown in so as to reduce ferric salts to the ferrous state with the precipitation of hydrated iron oxides. The process is conducted at a temperature of between 55° and 60°C. The upgraded ore and iron hydrate are subsequently separated by means of cyclones, elutriation, tabling, flotation and so on.

11 Claims, No Drawings

UPGRADING OF CHROMITE AND OTHER FERRUGINOUS ORES

This is a continuation of application Ser. No. 860,063, filed Sept. 22, 1969, now abandoned.

THIS invention relates to the upgrading of ferruginous materials such as chromite ores.

One of the main uses of chromite ores is in the production of ferro-chrome. For the optimum production of certain types of ferro-chrome the ratio of chrome to iron in the raw material should preferably be about 3:1. Naturally occurring ores with this ratio are relatively scarce, but there is an abundance of ores with lower ratios.

Therefore it has already been proposed to upgrade these relatively abundant ores to improve the chromium/iron ratio. In some of the prior proposals the first step consists in altering the iron content to a state in which the iron may be removed, usually by a leach solution. This is achieved by a reducing roast of one kind or another.

The leach solution that is used is frequently a mineral acid, such as sulphuric acid or hydrochloric acid, although solutions of inorganic salts have also been proposed.

U.S. Pat. No. 3 252 787 deals with a similar problem: the upgrading of ilmenite ores to improve the ratio between titanium dioxide and iron. In this case there is also a reducing roast followed by leaching with a ferric salt solution. Leaching is carried out in one step and after separation of the solids, the leach liquor is regenerated by bubbling air through it at 80°C. The regenerated solution is reused.

The present invention is based on the surprising discovery that if a ferruginous material in which the iron is present in the metallic or lower oxide form is leached with a ferric salt solution, the solution may be regenerated in situ by bubbling in air.

According to the invention a method of leaching iron from a material containing metallic iron or iron in the form of its lower valency acid soluble compounds by means of a solution of a ferric salt is characterised by the step of intimately contacting a mixture of the material and an iron salt solution with an oxygen-containing gas, with the result that the iron in the material reduces ferric salts in solution to the ferrous state while simultaneously oxygen in the gas oxidises ferrous salts to the ferric state.

The reactions involved with an iron sulphate salt may be portrayed by the following three equations:

$4 FeSO_4 + 2 Fe.Cr_2O_3 + 8 H_2O + 2 O_2 \rightarrow 6 FeO(OH) + 4 H_2SO_4 + 2 Cr_2O_3 + H_2$ $4 H_2SO_4 + 4 Fe.Cr_2O_3 \rightarrow 4 FeSO_4 + 4 Cr_2O_3 + 4 H_2$ and $Fe_2(SO_4)_3 + Fe.Cr_2O_3 \rightarrow 3 FeSO_4 + Cr_2O_3$ Surprisingly in each of the equations the reaction is continuously to the right. It seems that as the product of the first equation is continuously being removed as long as metallic iron (or iron of lower valency) is present, the first reaction proceeds at a faster rate than is normal when ferrous iron is oxidised by blowing in an oxygen-containing gas.

It is apparent that the starting solution need not be a ferric salt solution. Indeed it is preferred to start with a ferrous salt solution. The preferred salt is ferrous sulphate, although ferrous chloride may also be used with success.

In carrying out the leaching step the concentration of the ferrous salt is not critical. With ferrous sulphate a concentration of between 150 and 160 g/l has been found convenient. The presence of ferric ions in the solution is immaterial. Impurities such as alumina, silica and manganese do not react with the ferrous solution to any appreciable extent. The liquid to solids ratio is also relatively unimportant and the process has been used with success where the solids content was between 10 and 50 percent. The temperature should preferably be above 40°C.

There is some mechanical loss from the solution in the step of separating the solids from the solution and the possible formation of insoluble basic ferric salts. These losses represent the only reagent consumption from the process apart from air or oxygen. Acid ion reagent losses may be made up by treating part or all of the separated iron oxide with acid to reform the iron salt. Alternatively acid could be added directly to the leach vessel to bring the acid ion concentration up to the required level.

When starting from the raw ore the first step is to reduce the ore by roasting it in the presence of coal or coke. In the roasting operation at least a part of the iron content of the ore is converted to the metallic state or a lower valency state. It has been reported that iron carbides are also formed.

Chromite has been found to reduce satisfactorily at temperatures in the range 1100°C to 1400°C for a time of between 3 and 4 hours. For other ores different temperature times and reductants (e.g., reducing gases) may be applicable.

The method of selective reduction of the iron oxide component of ores and other materials is well known. In some cases it has been proposed to pre-oxidise the ore before reduction in order to assist in converting iron to the metallic state. The applicant has not found this step to be necessary, but in the case of chromite, the ore need be ground to a lesser fineness if it is pre-oxidised before reduction.

The roasted and reduced ore is then suspended in the iron salt solution, e.g., in a ferrous sulphate solution, and a gas such as air or oxygen in the form of fine bubbles is passed through the suspension. It has been found that the reaction proceeds about five times faster with oxygen than with air. After the required reaction time the two varieties of solids present in suspension, i.e., upgraded ore and iron hydrate are separated from the solution, e.g., by filtration, and then from one another, e.g., by means of cyclones, elutriation, tabling, flotation or other suitable means. The invention is further discussed by way of example in the following examples. In the initial series of examples the experiments fall into two steps: (a) prereduction and (b) leaching.

EXAMPLE I.

a. Prereduction:

Chromite having the composition shown below was used.

|  | % |
|---|---|
| $Cr_2O_3$ | 44.8 |
| Total Fe | 19.8 |
| CaO | 0.1 |
| MgO | 14.0 |
| $Al_2O_3$ | 14.6 |
| $SiO_2$ | 2.8 |
| Cr/Fe ratio = | 1.55 |

The ore was crushed such that 70 percent passed a 44 micron screen. 100 parts of the crushed chromite was mixed with 5 parts of coal crushed to pass a 74 micron screen and 0.15 parts of minus 250 micron sodium chloride.

This mixture was pelletized in the conventional manner on a disc pelletizer and then given a coating of coke 1.5 to 3 m.m. thick. An 0.5 percent addition of bentonite was made to this coke to act as a binder.

680 grams of these pellets, which varied in size from 12 to 22 m.m. diameter were place in a fireclay crucible and covered with a lid, on top of which was placed a few lumps of coke, and the whole inserted into a furnace at 1250°C. After 3 hours the pots were removed and the contents quenched into water. The pellets were then crushed to pass a 250 micron screen. The crushed reduced material contained 19.7 percent total iron and 4.8 percent metallic iron corresponding to a 25 percent conversion of the iron to the metallic state. Chromium was 45 percent $Cr_2O_3$.

When the reduced material was cooled under a nitrogen atmosphere instead of being quenched, the degree of conversion of iron to the metallic state was increased from 25 percent to 43 percent, corresponding to a metallic iron content of 8 percent.

b. Leaching:

An amount of the water-quenched product was suspended in 4.5 litres of ferrous sulphate solution containing 160 g/l of the salt. The suspension was placed in a pachuka and agitated with air and a vibromixer for 5.75 hours keeping the temperature at 60°C. At the end of the period the pH had become 3.45.

The suspension was removed from the pachuka and filtered and dried. A portion of the solids was then repulped in water and treated on a cyclosizer. The underflow product, which contained 87.9 percent of the initial $Cr_2O_3$ had the following analysis:

| | |
|---|---|
| $Cr_2O_3$ | 51.4% |
| Total Fe | 10.6% |
| Cr/Fe ratio | 3.03 |

From which one can conclude that although water quenching gives a lower content of metallic iron in the reduced product, the subsequent iron removal step is not adversely affected.

EXAMPLE II a. Prereduction:

A sample of chromite of the same composition as Example I was crushed such that 70 percent passed a 44 micron screen. 400 grams of the crushed material was mixed with 20 grams of minus 74 micron coal and 0.6 grams of minus 250 microns sodium chloride. The mixture was placed in a fireclay pot and this pot placed inside another larger pot. The annular space was filled with lumps of coke and loose fitting lids placed on both the inner and outer pots. The assembly was put into a furnace at 1250°C and left for 3 hours and the contents then cooled under nitrogen. The reduced product has a metallic iron content of 6.6 percent and a total iron content of 19.7 percent. The chromium content was 44 percent $Cr_2O_3$.

b. Leaching:

A 167 g batch of the prereduced material was agitated in 1750 ml of 160 g/l $FesO_4$ at 60°C in a 2 litre round bottom flask. A vibromixer attached to an air supply was used to pass fine bubbles through the solution. After 2½ hours the pH had dropped to 3.25 and the leach was stopped.

The leached material after filtration and drying assayed 44.2 percent $Cr_2O_3$ and 16.6 percent Fe. A portion of this material was repulped in water and treated in a cyclosizer. This resulted in an underflow containing 51.1 percent $Cr_2O_3$ and 14.3 percent FeO, i.e., a Cr/Fe ratio of 3.15. These figures represent a chromium recovery of 89.9 percent.

EXAMPLE III

This example shows that the liquids/solids ratio in the leaching step is relatively unimportant.

The reduced product used in example IV was agitated with 150 g/l $FeSo_4$ solution in a flotation cell in a series of experiments using various liquids/solids ratios. The leach product was cyclosized and the upgrading products had the Cr/Fe ratios given in the table below.

TABLE I

| Volume of slurry treated, litres | Wt.of reduced chromite in slurry G | Duration of leach. mins. | Temp. °C | pH at end of leach. | Analysis of upgrading chromite | | |
|---|---|---|---|---|---|---|---|
| | | | | | $Cr_2O_3$ | FeO | Cr/Fe |
| 2.5 | 270 | 32 | 55 | 3.45 | 49.9 | 13.7 | 3.2 |
| 2.5 | 585 | 65 | 55 | 3.3 | 51.3 | 12.9 | 3.5 |
| 2.5 | 765 | 82 | 56 | 3.45 | 49.0 | 12.7 | 3.4 |
| 2.5 | 1416 | 130 | — | 3.45 | 49.8 | 11.7 | 3.3 |
| 2.5 | 1974 | 163 | 55 | 3.4 | 49.9 | 11.8 | 3.7 |

EXAMPLE IV.

A bulk sample of reduced chromite was prepared by blending a number of smaller samples of reduced chromite produced by a variety of reduction techniques. The sample had the following composition:

| | % |
|---|---|
| $Cr_2O_3$ | 43.8 |
| Total Fe | 13.9 |
| Metallic Iron | 3.5 |
| MgO | 15.0 |
| CaO | 0.2 |
| $Al_2O_3$ | 11.9 |
| $SiO_2$ | 8.8 |
| S | less than 0.1 |
| C | 4.4 |

Note that 25 percent of the total iron was present in the metallic form. The response of this material to the leaching process of the invention was determined as follows:

250 grams of the reduced material was suspended in a solution containing 2.25 litres of water and 659 grams ferrous sulphate, the following being a typical composition of the solution:

|  | grams/litre |
| --- | --- |
| Ferrous sulphate | 152 |
| Ferric sulphate | 5.37 |
| Total sulphate | 114.2 |
| pH | 4.3 |

The suspension was placed in a 2.5 litre laboratory Fagergren flotation cell and agitated and aerated for 43 minutes. the contents of the cell were heated to maintain a temperature of 55°C.

During the agitation, the pH of the solution decreased regularly and a brown coloured precipitate formed. After 43 minutes the pH value had decreased to 3.5 and this was an indication of the completion of the reaction, although no harm would have resulted from continuing agitation and aeration and allowing the pH to fall further.

The solution and solids were separated by filtration and the residue given a light water wash to free it from entrained ferrous sulphate. The leached solids after drying analysed 42.4 percent $Cr_2O_3$ and 12.7 percent total iron.

A representative portion of the residue obtained on filtration was repulped in water and treated in a cyclosizer, thus obtaining an underflow and an overflow. These products had the following compositions.

|  | %$Cr_2O_3$ | %Total Fe | Cr/Fe ratio |
| --- | --- | --- | --- |
| Underflow | 45.6 | 9.8 | 3.18 |
| Overflow | 10.6 | 31.2 |  |

The indicated chromium recovery in the underflow from the cyclosizing separation was 98%.

EXAMPLE V 250 grams of reduced chromite were leached in 2 litres of a solution containing 209 g/l ferrous chloride in a laboratory Fagergren flotation machine. The solution temperature was maintained at 60°C. Agitation was continued for 70 minutes by which time the pH value of the slurry had dropped from 4.5 to 2.6. It was observed during this run that the hydrated iron oxide produced had a much darker colour than in the leaches in which ferrous sulphate was used as the lixiviant.

After filtration the leach residue was washed and dried. The leach residue contained 42.4 percent $Cr_2O_3$ and 12.9 percent total iron. A 40 gram representative sample was treated on the cyclosizer giving underflow and overflow products of the following compositions.

|  | %$Cr_2O_3$ | % Total Fe | Cr/Fe ratio |
| --- | --- | --- | --- |
| Underflow | 45.5 | 10.10 | 3.1 |
| Overflow | 11.5 | 31.39 | — |

These figures represent a chromium recovery in the underflow of 99 percent.

EXAMPLE VI 177.3 Kg of chromite reduced as used in example III were suspended in 1939 litres of ferrous sulphate solution containing 175.9 g/l $FeSo_4$ and treated in a large heated vessel constructed after the fashion of a Fagergren flotation cell.

After agitating for 76 minutes at 54°C, when fallen pH had fallen from a maximum value of 4.5 to a value of 3.2, agitation was stopped.

The estimated dry weight of the recovered solids obtained in the leach was 175.4 kg.

After separation of the bulk of solution from the solids by decantation and filtration a portion of the leached material was treated in a cyclosizer.

The products obtained on cyclozising had the following weights and analyses:

|  | Weight,grams | $Cr_2O_3$ | Fe(total) | Cr/Fe ratio. |
| --- | --- | --- | --- | --- |
| Underflow | 39.9 | 45.3 | 10.6 | 2.94 |
| Overflow | 5.5 | 9.1 | 40.0 |  |

The indicated chromium recovery in the concentrate after cyclosizing was 97.3 percent.

The ferrous sulphate solution used in leaching had the following initial and final compositions.

|  | Initial | Final. |
| --- | --- | --- |
| Ferrous sulphate g/l | 175.9 | 179.8 |
| Ferric sulphate g/l | 4.1 | 2.8 |
| Total sulphate g/l | 114.2 | 115.7 |
| pH | 2.43 | 3.20 |

1800 grams of the leached material was treated in a single pass over a Denver Shaking Table. The various products obtained had the following compositions:

| of Cr. % | Wt. grams | $Cr_2O_3$ % | Total Fe | Cr/Fe % | Distribution ratio |
| --- | --- | --- | --- | --- | --- |
| Concentrate | 122 | 50.6 | 11.4 | 3.02 | 81.9 |
| Middling | 39 | 27.2 | 15.3 | 1.23 | 14.0 |
| Tailing | 16 | 19.3 | 32.6 | 0.45 | 4.1 |

A portion of the leached and filtered material was treated in a small industrial de-watering cyclone at a pressure of 0.7 – 1.75 kg/cm² and slurry density varying from less than 5 percent to 25 percent. The following products were obtained:

| | $Cr_2O_{3\%}$ | Total Fe % | Cr/Fe |
|---|---|---|---|
| First Pass — Underflow | 42.3 –46.5 | 8.6 – 9.6 | 3.30 – 3.39 |
| — Overflow | 24.7 – 25.7 | 32.9– 36.8 | |
| *Second Pass — Underflow | 42.7 – 56.1 | 12.7– 10.7 | |
| — Overflow | 23.7 – 25.2 | 42.4– 44.7 | |

*Material treated in second pass was the overflow from the first cyclone pass.

A further portion of the leached material was subjected to elutriation to rinse away the finely divided iron oxide. The upgraded chromium product had the following analysis:

| | |
|---|---|
| $Cr_2O_3$ | 4.47% |
| Total Fe | 10.04% |
| Cr/Fe ratio | 3.03 |

EXAMPLE VII.

A phosphate ore containing 35.9 percent $P_2O_5$ and 6.9 percent total Fe was ground to pass a 250 micron screen. 200 grams of the ore was mixed with 10 grams of coal and 0.3 grams of powdered sodium chloride.

The resultant mixture was placed in a fireclay pot, covered with a lid and then reduced for 2 hours at 1050°C. 196 grams of reduced material was recovered and the analysis was as follows:

| | % |
|---|---|
| $P_2O_5$ | 36.5 |
| Total Fe | 6.63 |
| Metallic Iron | 4.90 |

173.9 grams of the reduced material was leached in 2 litres of 160 g/l ferrous sulphate solution at 55°C for 65 minutes until the pH attained a value of 3.1. The leaching operation was carried out in a laboratory Fagergren flotation cell.

The pulp was filtered and a portion treated in a cyclosizer.

The main product had the following composition:

| | % |
|---|---|
| $P_2O_5$ | 38.8 |
| Total Fe | 2.18 |

The recovery of phosphate in this product was 86 percent while 94 percent of the metallic iron content of the reduced material was removed by the leaching process.

EXAMPLE VIII

Samples of an ilmenite ore containing 49.4 percent $TiO_2$ and 35.6 percent total Fe were crushed to minus 144 micron, thoroughly mixed with 20 – 30 percent by weight of minus 144 micron, coke and 1.5 – 3 percent by weight of sodium chloride. The various samples were then placed in crucibles and heated at 1050°C for 2 hours in an electric furnace. After cooling the samples under nitrogen, a composite sample was prepared and crushed to minus 144 microns. This sample contained 52.2 percent $TiO_2$, 35.1% total Fe and 30.1 percent metallic iron, i.e., 86 percent conversion to metallic iron.

250 grams of the reduced material were leached at approximately 57°C in 2250 ml of 160 g/l ferrous sulphate solution in a Fagergren flotation cell. After 3¼ hours the pH of the pulp had changed from 5.0 to 3.35 units and the leach was terminated. The leached solids after filtering and drying were crushed to minus 144 microns and thoroughly mixed. A portion of this material was then treated in a cyclosizer to give underflow and overflow fractions. The analyses of these samples were:

| | $TiO_2$.% | Total Fe.% |
|---|---|---|
| Underflow | 73.67 | 9.74 |
| Overflow | 3.75 | 52.90 |

The recovery of $TiO_2$ in the underflow fraction amounted to 91.5 percent.

EXAMPLE IX

The temperature at which the leaching step is carried out is important, in that the leaching rate is proportional to the temperature. This is illustrated by the following table, which is based on results obtained on leaching 2.5 litres of slurry in a Fagergren flotation cell. The 270 g of solids used for leaching were reduced as described in example III, while the solutions contained 160 g/l $FeSO_4$.

| Temperature of slurry, °C | Leaching rate gms of upgraded chromite formed per hour per litre of solution. |
|---|---|
| 40 | 55.5 |
| 55 | 206.0 |
| 65 | 412.0 |
| 75 | 890.0 |

The actual temperature to be used in practice will depend on considerations such as desired capacity, power and fuel costs, availability of water and so on. In the laboratory it is preferred to operate at 55° – 60°C.

EXAMPLE X

In order to demonstrate that particle size within reasonable limits has little effect on the reduction and leaching of a representative chromite, the following test was performed. An ore of the following nominal composition was crushed:

| | % |
|---|---|
| $Cr_2O_3$ | 41.3 |
| Total Fe | 18.7 |
| $SiO_2$ | 6.5 |
| MgO | 11.0 |
| $Al_2O_3$ | 15.0 |
| CaO | 1.0 |
| Cr/Fe | 1.51 | of this material the minus 250 micron plus 144 micron material was screened out and reduced at 1250°C for 3 hours in a fireclay pot with addition of 10 parts coal and 1 part salt per 100 parts of chromite. After reduction the material was cooled in nitrogen atmosphere. The reduced material had the following composition:

29.0 percent Cr (42.3 percent $Cr_2O_3$), 20.5 percent Total Fe (26.4 percent FeO), 12.9 percent Fe (Metallic)

This represents a conversion to metallic iron of 62.8 percent of the total iron present.

A batch of 150 g of this reduced material was leached in a round bottomed flask containing 1500 ml of 160 g/l $FeSO_4$ solution at a temperature of 60°C. Air was supplied at 3 litres per minute into a vibromixer device which broke up the gas stream and agitated the solids. After 4¾ hours the pH had dropped to 2.25 and the leaching operation was stopped.

In fact leaching could have stopped when a pH of 3.5 had been reached as it has been found that this pH indicates the end of the reaction.

The chromite and hydrated iron oxide were filtered on a coarse frit of sintered glass. The finely divided iron oxide passed through the frit while the chromite was retained. The washed and dried chromite product was found to contain 50.5 percent $Cr_2O_3$ and 7.8 percent Total Fe corresponding to a Cr/Fe ratio 4.40.

The chromite recovered amounted to 95.8 percent of the weight originally treated.

EXAMPLE XI

A representative portion of the pulp of the leached solids and accompanying solution used in example IV was transferred to a Fagergren flotation cell where it was heated to 60°C. The pulp was aerated to suspend most of the solids and then Aero Promoter 825*, equivalent to 0.25 lb/ton of solids, was added. Pulling of the froth was started immediately and continued for 2 minutes to give the first rougher concentrate. A further 0.25 lb/ton of Aero Promoter 825 was added and the froth pulled for 4 minutes to give the second rougher concentrate. At this stage the volume of material in the cell was made up to the original volume with fresh ferrous sulphate leach solution. Froth was pulled for a further 4 minutes to give the third rougher concentrate. The solids remaining in the cell were regarded as the rougher tailing. The concentrates and tailing analyses gave the following results:

|  | % $Cr_2O_3$ | % FeO |
|---|---|---|
| First rougher concentrate | 15.0 | 21.3 |
| Second rougher concentrate | 14.2 | 12.6 |
| Third rougher concentrate | 27.5 | 20.3 |
| Rougher tailing | 45.1 | 13.9 |

These results represent a recovery of 94.1 percent of the $Cr_2O_3$ in the tailing at a grade of 45.1 percent $Cr_2O_3$, and with a Cr/Fe ratio of 2.86.

* Aero Promoter 825 is a product of the Cyanamid Company.

EXAMPLE XII

For purposes of comparison an experiment was set up to conduct a two stage leach.

The circuit consisted of a Fagergren flotation cell for oxidation of ferrous sulphate solution, a continuous centrifuge for removal of hydrated iron oxide formed in the Fagergren cell, a leaching vessel fitted with a propellor stirrer and to which pre-reduced chromite was fed, a series of settlers for retention of coarse chromite carried over from the vessel, a filter for removal of fine chromite and a pump for returning filtered liquid to the Fagergren cell.

In an experiment 833 grams of prereduced ore as used in example VI was placed in the reducing vessel. The leach solution consisted of 8500 ml of 160 g/l ferrous sulphate solution maintained at 55°C and was circulated at the rate of 500 ml per minute. Measurements of pH were taken in the leach vessel.

At 15 minute intervals the small amounts of chromite carried over to the settlers and filters were returned to the leach vessel. Complete exclusion of chromite from the oxidation cell was found to be extremely difficult and fine chromite passing through the filter entered the oxidation cell and eventually the centrifuge, thus contaminating the hydrated iron oxide precipitate.

After 5.2 hours of operation the pH value in the leach vessel had reached 4.35 and the test was stopped. After filtration washing and drying a representative sample of the solids was treated on a cyclosizer and gave an underflow of the following composition:

| % $Cr_2O_3$ | % Iron as FeO | Cr/Fe |
|---|---|---|
| 43.1 | 13.6 | 2.88 |

Chromium recovery was approximately 92 percent.

This test demonstrated the slower rate of leaching of the two stage process, the difficulty of keeping chromite and iron oxide apart and the need for continuous circulation.

We claim:

1. A method of upgrading an ore selected from the group consisting of chromite, ilmenite and phosphate which is rendered lowgrade by the presence of iron oxide and which ore has been roasted to reduce the iron oxide to the metallic state consisting in the steps of intimately admixing a mixture of the roasted ore and an iron salt solution, selected from ferrous sulphate and ferrous chloride solution, with a gas containing free oxygen, at about ambient pressure, with the result that the iron in roasted ore reduces ferric salts in solution to the ferrous state while simultaneously oxygen in the gas oxidizes ferrous salts to the ferric state so that metallic iron is leached from the roasted ore to leave insoluble residual ore particles and to form insoluble hydrated iron oxide, and separating the residual ore particles from the solution and the hydrated iron oxide to provide an ore product which is less diluted by the presence of iron oxide.

2. The method claimed in claim 1 in which the ore is a chromite ore that has been so prereduced that a substantial proportion of the iron present is in an acid soluble form.

3. The method claimed in claim 1 in which the ore is an ilmenite ore which has been so prereduced that a substantial proportion of the iron present is in an acid soluble form.

4. The method claimed in claim 1 in which the ore is a phosphate ore which has been so prereduced that a substantial proportion of the iron present is in an acid soluble form.

5. The method claimed in claim 1 in which the iron salt is ferrous sulphate.

6. The method claimed in claim 1 in which the iron salt is ferrous chloride.

7. The method claimed in claim 1 in which the gas is air.

8. The method claimed in claim 1 in which the gas is oxygen.

9. The method claimed in claim 1 in which leaching is carried out at a temperature of above 40°C.

10. The method claimed in claim 1 in which leaching is carried out at a temperature of between 55°C and 75°C.

11. The method claimed in claim 1 in which leaching is carried out at a temperature of between 55° and 60°C.

* * * * *